Sept. 18, 1951     F. R. CHESTER     2,568,318
DRIVE MECHANISM FOR EGG BEATERS
Filed March 23, 1946     2 Sheets-Sheet 1
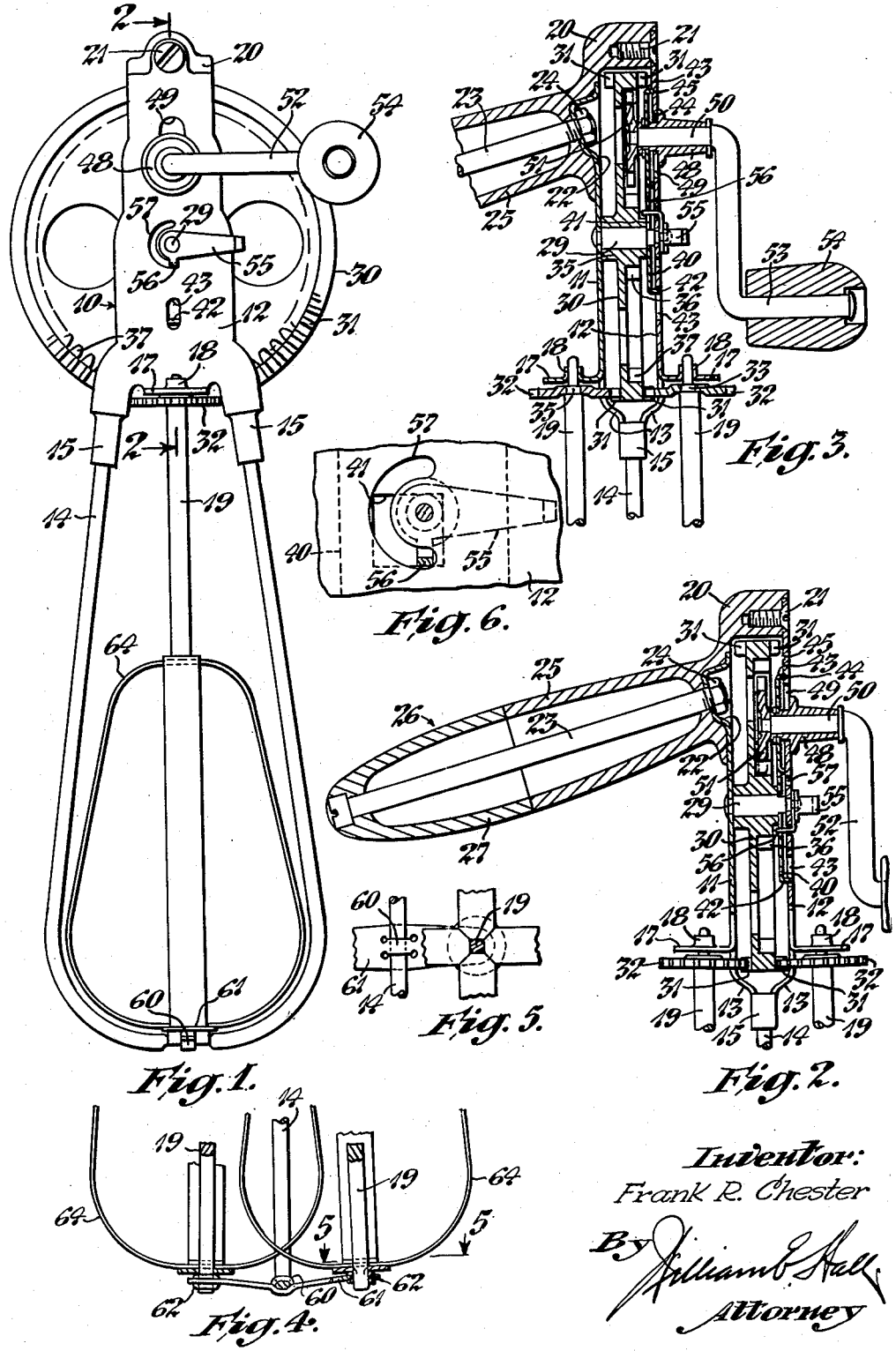
Inventor:
Frank R. Chester
By William E. Hall
Attorney Sept. 18, 1951     F. R. CHESTER     2,568,318
DRIVE MECHANISM FOR EGG BEATERS
Filed March 23, 1946     2 Sheets-Sheet 2
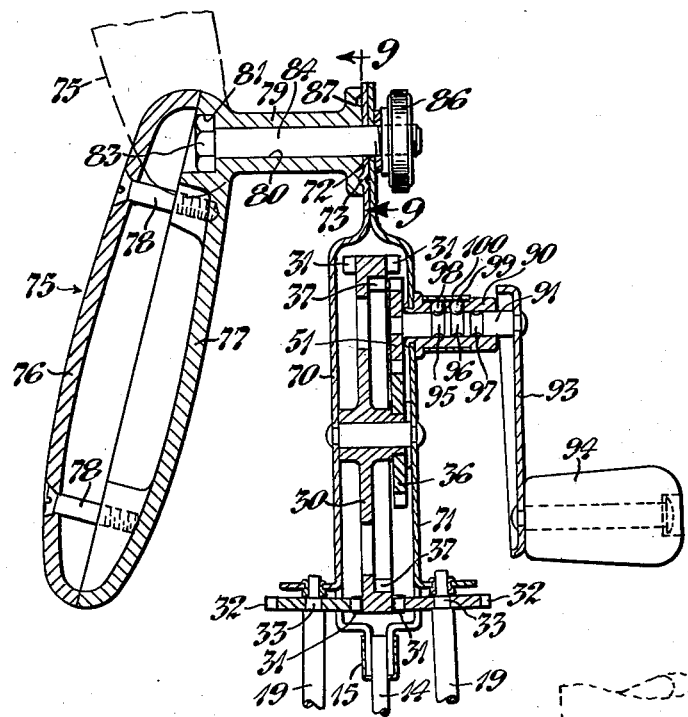
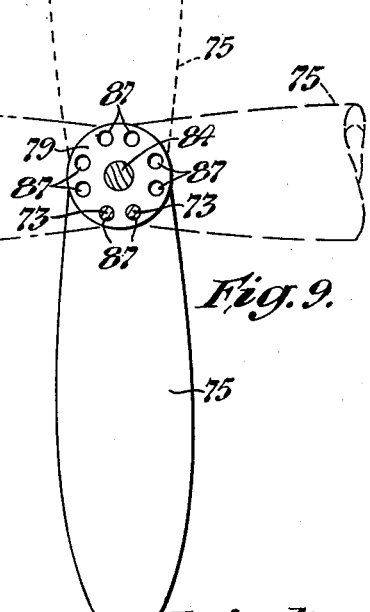
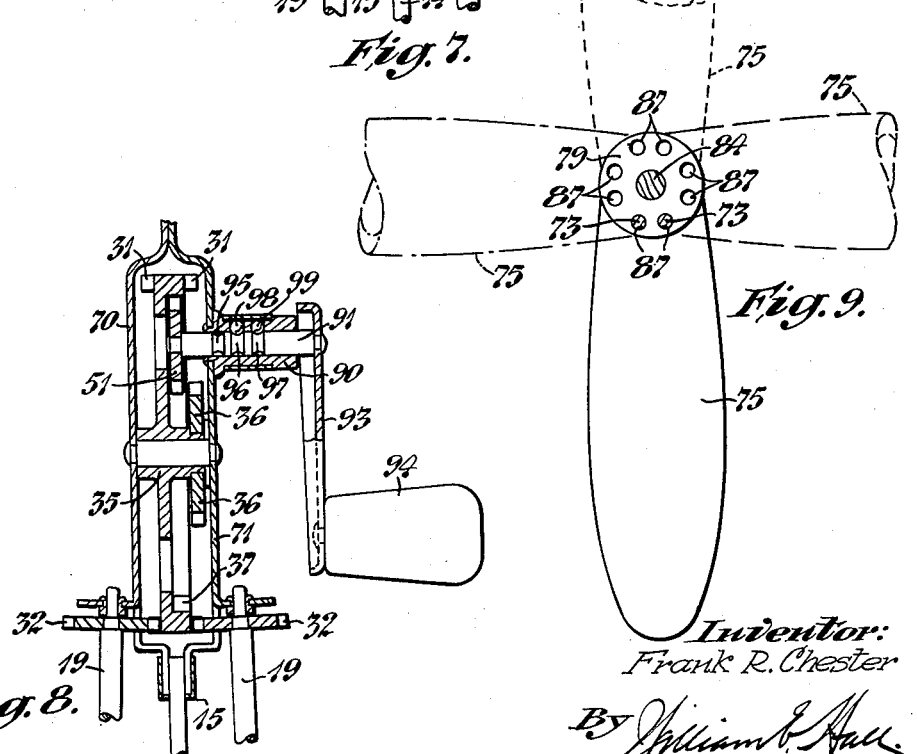
Inventor:
Frank R. Chester
By William E. Hall
Attorney Patented Sept. 18, 1951

2,568,318

UNITED STATES PATENT OFFICE 2,568,318

DRIVE MECHANISM FOR EGG BEATERS

Frank R. Chester, Santa Monica, Calif.

Application March 23, 1946, Serial No. 656,700

4 Claims. (Cl. 74—665)

My invention relates to mixing or agitating devices, and particularly to a device for mixing liquids and semi-liquids, and to devices commonly referred to as egg beaters. Specifically, the invention pertains to a drive mechanism by which the agitator elements of the device are driven.

Mixing devices, particularly those of the manually-operated egg beater type, usually comprise a frame, a pair of agitating or mixing members rotatable on the frame, gears on the agitating members in mesh with a drive gear, also rotatably mounted on said frame, and driven by a handle or knob fastened to the side of the drive gear. This type of mixing device has been in use for many years and operates quite efficiently for most purposes. However, it has been determined that, due to the fixed ratio between the gears of the device, it is necessary to rotate the drive gear either at a fast rate of speed to obtain relatively fast rotation of the beater members, or it is difficult to rotate the beaters even at a slow speed when attempting to agitate or stir heavy or viscous substances. Change-speed mechanisms in devices of this class have been ineffective, inefficient, and cumbersome for the purposes intended. Such devices are also usually provided with a centrally disposed and fixed handle arranged directly above the drive gear, and it is extremely difficult to prevent the lower end of the device from sliding laterally, especially when the device is used for mixing ingredients in certain receptacles in which the device rests.

It is a prime object of my invention to provide a mixing device having a novel and improved drive mechanism in which is incorporated means for varying the speed ratio between the manually-operated handle and the agitating members.

An important object of this invention is to provide a novel change-gear mechanism for easily and quickly changing the speed ratio.

An important feature of such change-gear mechanism is a construction thereof in which the drive gear or pinion will not be disengaged or come out of mesh from both of two driven gears unless and until the drive gear or pinion is wholly in mesh with one of the driven gears.

Another important feature of such change-gear mechanism is a construction thereof in which the teeth of the drive gear or pinion are always so aligned with the teeth of the driven gears so that there will be no clashing of teeth when changing the intermeshing of the gears.

An important object also of this invention is the provision of gears, for transmitting power between angularly positioned or right angle shafts, in which thrust is eliminated so that there is no tendency to separate or to shift the gears when not desired.

An important object of this invention is to provide a novel change-gear mechanism for easily and quickly changing the speed ratio.

Another object is to provide a mixing device of improved sturdy construction, and one which will not readily deteriorate or get out of order.

Another object is to provide a mixing device having a handle located at the side for supporting the device in upright position, and means for adjusting the handle angularly on the frame of the device in accordance with the character of work to be performed, to facilitate the mixing operation when the mixing bowl is arranged at different heights with respect to the operator.

Still another object of this invention is to provide a device of this class which may be easily cleaned.

Further objects of the invention are set forth in the following specification, which describes two preferred forms of construction of the device, by way of example, as illustrated by the accompanying drawings. In the drawings:

Fig. 1 is a side elevational view of a mixing device embodying the novel features of my invention;

Fig. 2 is a vertical sectional view taken on line 2—2 of Fig. 1, showing the driving elements adjusted to effect high speed rotation of the agitating or beater members;

Fig. 3 is a view similar to Fig. 2, but showing the driving elements adjusted to effect slower rotation of the agitating members;

Fig. 4 is a fragmentary vertical sectional view of the lower portion of the device;

Fig. 5 is a sectional plan view on line 5—5 of Fig. 4;

Fig. 6 is an enlarged part-sectional elevation of the gear shifting means for the device illustrated in the preceding figures;

Fig. 7 is a vertical sectional view of the upper portion of a mixing device of modified construction and showing the driving elements adjusted to rotate the agitating members at a relatively high rate of speed;

Fig. 8 is a view similar to Fig. 7, showing the driving elements adjusted to effect a slower speed; and, Fig. 9 is a vertical section taken on line 9—9 of Fig. 7 and indicating the manner in which the supporting handle may be adjusted.

Referring first to Figs. 1 to 6, inclusive, my improved mixing device comprises a frame member 10 composed of two parallel sheet metal plate-like members 11 and 12 which are bent inwardly, as indicated at 13, to straddle the opposite sides of a wire loop or support 14, sleeves 15 embracing or securing together the lower ends of the members 11 and 12, at spaced apart portions around the upper ends of the wire support 14, to maintain these parts in assembled relationship. The members 11 and 12 are also provided with laterally bent ears 17 having bearings 18 in which the upper ends of shafts 19 are rotatable. The upper ends of the members 11 and 12 are joined together by a head 20. The member 12 is secured to the outer face of the head 20 by a screw 21, while the member 11 is fastened to the inner surface of a recess 22 in the head by a bolt 23 and nut 24.

As shown in Fig. 2, the head 20 is formed with a tubular section 25, which constitutes substantially one-half of a hollow supporting handle 26. The mating section 27 of the handle 26 is held in engagement with the section 25 by the bolt 23, which passes through holes in both sections with the head of the bolt seated in a counterbore in the outer end of the section 27. The nut 24 which is screwed onto the inner threaded end of the bolt secures the parts together. The handle 26 preferably projects laterally and is inclined downwardly, as shown in Fig. 2, to provide a convenient grip and to effectively avoid gyration of the device during the rapid rotation of the agitating members.

Rotatable on a pin 29 extending transversely between the frame members 11 and 12 is an intermediate driving member 30 provided with crown gear teeth 31 on its opposite faces adjacent its periphery. The gear teeth 31 mesh with the teeth of gears 32 mounted on square portions 33 of the agitator shafts 19. The hub 35 of the driving member 30 is formed with gear teeth thus providing a pinion gear 36. Adjacent the periphery of the member 30 are gear teeth providing an internal gear 37.

Mounted for vertical sliding movement between the hub of the member 30 and the frame member 12 is a plate member 40 having a square aperture 41 through which the pin 29 extends. The lower end of the plate 40 has a tab 42 which projects through a slot 43 in the frame member 12. At the upper end of the plate is a detent tab 43 adapted to be engaged in either of two depressions 44 and 45 in the rearward face of the frame member 12. Fastened to the plate member 40 is a tubular bearing element 48, which passes through an elongated opening 49 in the frame member 12 and in which a shaft 50 is rotatable. Fast on the inner end of the shaft 50 is a drive gear 51 of substantially the same size as the pinion gear 36. The outer end of the shaft 50 is provided with a crank arm 52, preferably formed integral therewith, the crank arm having a bent end 53 carrying a rotatable handle or knob 54.

The plate member 40 is adapted to be shifted vertically to engage the drive gear 51 with either the pinion gear 36, as shown in Fig. 2, or with the larger internal gear 37, as illustrated in Fig. 3, and this shifting action is effected by means of a shift lever 55 rotatable on the projecting end of the pin 29. The lever 55 has a laterally bent finger 56, which projects inwardly through an arcuate slot 57 in the frame member 12 and into the square aperture 41 of the plate member 40. When the lever 55 is turned to the position shown in Figs. 1 and 6 the finger 56 will engage the lower edge of the aperture 41 to move the plate member 40 downwardly and cause the drive gear 51 to mesh with the pinion gear 36. On the other hand, when the lever 55 is turned 180° from the position shown in Fig. 6 the finger 56 will move upwardly in the curved slot 57 to engage the upper edge of the aperture 41 to move the plate member 40 upwardly to engage the drive gear 51 with the internal gear 37. The engagement of the tab 43 of the plate member 40 in the depressions 44 or 45 serves to retain the plate member in either position of adjustment.

The lower looped portion of the wire support member 14 passes through a slitted portion 60 of a base member 61 provided with bearings 62 adjacent its outer ends in which the lower ends of the shafts 19 are journaled. The lower part of each shaft 19, above the bearings 62, is of square cross-section, see Fig. 5, to adapt the agitator members 64 to be keyed rotatively therewith. The agitator members 64 comprise curved strips of sheet metal which are mitered and welded together, as indicated in Fig. 5, whereby to provide a unitary structure.

The mixing device shown in Figs. 1 to 6, inclusive, is applied to use by placing its lower end into the bowl, pan, or other receptacle, containing liquid to be admixed or liquids to be whipped. When the liquid is to be whipped or beaten, it is important that the agitator members 64 rotate at a relatively high rate of speed. However, it is desirable that the rapid rotation of the agitator members be effected with a minimum of effort on the part of the operator of the device. To produce high speed rotation of the agitator members while turning the crank 52 at a comparatively slow speed, the drive gear 51 is meshed with the pinion gear 36 by sliding the plate member 40 downwardly in the manner previously explained. Assuming that the gears 51 and 36 are of equal diameter and that the ratio of the gears 31 to the gears 32 is 4 to 1, one revolution of the crank 52 and drive gear 51 will cause the agitating members to turn through four revolutions, and if the drive gear 51 is rotated at a speed of 100 R. P. M. the agitating members will be rotated at a speed of 400 R. P. M. during the same period to produce the desired whipping action. During the whipping or beating operation, the device may be held in upright position by the handle 26, and, because the handle is located at the side of the device, the tendency of the device to slide in the bowl or pan or to turn, due to the gyrating action of the agitating members, is avoided.

It is desirable when mixing ingredients of relatively dense nature that the ratio of speed between the drive gear 51 and gears 32 be reduced in order to obtain the necessary power. To change the ratio of speed, the plate member 40 is slid upwardly to engage the drive gear 51 with the internal gear 37. Assuming, for example, that the ratio between the gears 51 and 37 is 1 to 5 and the ratio between the gears 31 and 32 is 4 to 1, then the ratio between the gears 51 and 32 will be 4 to 5. In other words, four revolutions of the crank 52 and gear 51 will cause five revolutions of the agitating members 64. Thus it is apparent that by engaging the drive gear 51 with the internal gear 37 the speed ratio may be decreased and the rotative speed of the agitating members consequently reduced. During the shifting movement of the gear 51 to high and low speed positions, the teeth of the gear 51 engage with the teeth of the pinion gear 36 before being released from the teeth of the internal gear 37, and vice versa, so that it is unnecessary to turn the gear 51 to mesh its teeth with those of the gear 36 or with those of the gear 37, as the case may be.

Referring now to Figs. 7, 8, and 9, a modified form of mixing device is illustrated. In this device frame members 70 and 71, similar to the members 11 and 12 previously described, are employed. The members 70 and 71 are secured together at their upper ends and are provided with aligned holes 72. The member 70 is also provided with one or more rounded detent projections 73. A hollow supporting handle 75 is disposed at one side of the frame and comprises two mating parts 76 and 77 fastened together by screws 78. The part 77 is provided with a hub portion 79 having a bore 80 provided with a polygonally shaped socket 81 at one end for receiving the polygonal head 83 of a bolt 84, which extends through the bore 80 and the holes 72 of the frame members 70 and 71. A thumb nut 86 screwed onto the threaded end of the bolt 84 serves to clamp the hub 79 firmly against the side of the frame. The end face of the hub 79 is provided with a series of depressions 87 for receiving the projections 73 whereby to prevent rotation of the handle 75. The handle 75 is adapted to be adjusted to vertical and horizontal positions by first loosening the thumb nut 86 and turning the handle to the positions indicated in Fig. 9 to align the depressions 87 with the projections 73, after which the thumb nut 86 is tightened to clamp the handle in its adjusted position. Through this provision the handle 75 may be readily adjusted to facilitate the operation of the device.

The device shown in Figs. 7, 8, and 9, employs a driving member 30 of the same construction as the driving member previously described in connection with the device illustrated in Figs. 1 to 6, and said driving member is adapted to rotate gears 32 carried by the agitator shafts 19. A tubular bearing member 90 is fastened to the side of the frame member 71 and has an axial bore in which a shaft 91 is adapted to rotate. The inner end of the shaft carries a drive gear 51, which is adapted to mesh with the pinion gear 36 or the internal gear 37 forming part of the driving member 30. Secured to the outer projecting end of the shaft 91 is a crank arm 93 provided with a handle or knob 94. The shaft 91 is provided with three longitudinally spaced peripheral grooves 95, 96, and 97, adapted to receive balls 98 and 99 which are slidable in radial holes in the bearing member 90. The balls 98 and 99 are urged inwardly by a spring member 100 surrounding the bearing member 90.

With the parts of the device in the position shown in Fig. 7, that is, with the drive gear 51 in mesh with the pinion gear 36, rotation of the crank arm 93 will effect relatively fast rotation of the agitator shafts 19 and agitating members carried thereby. When the gear 51 is in mesh with the pinion gear 36 the balls 98 and 99 will be engaged in the grooves 95 and 96 to retain the gear in this position. To change the ratio between the drive gear 51 and the gears 32 to drive the agitating members at a slower rate of speed, the shaft 91 is pushed inwardly to shift the drive gear 51 from the position shown in Fig. 7 to that illustrated in Fig. 8 to engage it with the internal gear 37. During this shifting movement, the teeth of the gear 51 engage with the teeth of the internal gear 37 before being released from the teeth of the pinion gear 36 so that it is unnecessary to turn the gear 51 to mesh its teeth with the teeth of the internal gear 37. As the shaft 91 is shifted axially in this direction, the balls 98 and 99 will enter the grooves 96 and 97, respectively, as shown in Fig. 8, to retain the gear 51 in engagement with the internal gear 37.

It will be observed from the foregoing that my invention provides a simple, yet efficient, device for mixing or beating various liquids or semi-liquids. As a particular feature of improvement, the improved mixing device is provided with means for varying the speed ratio between the rotation of the operating crank and the agitating members, in accordance with the nature of the work to be performed by the mixing device, so that when relatively light or thin liquids are being mixed the agitating members may be driven at a high rate of speed by rotating the operating crank at a relatively slow speed. Conversely, the agitating members may be driven at a slower rate of speed by changing the speed ratio between the crank and the agitating members whereby to derive greater power when mixing semi-liquids.

As another feature of improvement, the supporting handle is disposed at the side of the device to greatly facilitate the mixing operation, and the handle may be readily adjusted to the operator's convenience.

While my improved mixing device has been herein shown and described as embodied in two preferred forms of construction, by way of example, it is to be undestood that various changes may be made in the construction without departing from the spirit or scope of the invention. Therefore, without limiting myself in this respect, I claim:

1. In a mechanism of the class described: a frame; an operating member rotatable on said frame; a driven gear for the operating member; a driving member rotatable on said frame and provided with a crown gear in mesh with the driven gear, said driving member also including a pinion gear and an internal gear arranged concentric with and surrounding said pinion gear; a plate member movable on said frame radially of said driving member; a drive gear rotatable on said plate member; and means for rotating said drive gear, said plate member being movable in one direction to engage said drive gear with said internal gear and in another direction to engage said drive gear with said pinion gear whereby to vary the speed ratio between said drive gear and said operating member, said pinion, when being shifted from enmeshed relation from one to the other gear, being adapted to mesh with both gears until wholly enmeshed with one.

2. In a mechanism of the class described: a frame; a pair of operating members rotatable on said frame and carrying gears; an intermediate driving member rotatable on said frame and provided with crown gear teeth on its opposite faces in mesh with the teeth of said gears on said operating members, said intermediate member also including a pinion gear and an internal gear arranged concentric with and surrounding said pinion gear; a plate member movable on said frame radially of said intermediate member; a drive gear rotatable on said plate member; and means for rotating said drive gear, said plate being movable in one direction to engage said drive gear with said internal gear and in another direction to engage said drive gear with said pinion gear whereby to vary the speed ratio between said drive gear and said operating members, said pinion, when being shifted from enmeshed relation from one to the other gear, being adapted to mesh with both gears until wholly enmeshed with one.

3. In a mechanism of the class described: a frame; a driven member rotatable on said frame and having a pinion gear and an internal gear arranged concentric with and surrounding said pinion gear; a plate member movable on said frame radially of said driven member, said plate member having a bearing; a crank rotatable in said bearing; a drive gear carried by said crank, said plate member, said drive gear, and said crank being movable as a unit in one direction to engage said drive gear with said internal gear and in another direction to engage said drive gear with said pinion gear whereby to vary the speed ratio between said drive gear and said driven member; and co-operating means on said frame and said plate member for retaining said plate member in either position to which it is moved.

4. In a mechanism of the class described: a frame having an arcuate opening; a pin on said frame; a driven member rotatable on said frame and having a pinion gear and an internal gear arranged concentric with and surrounding said pinion gear; a plate member movable on said frame radially of said driven member and provided with a rectangular opening; a drive gear rotatable on said plate member; crank means on said plate member for rotating said drive gear; a shifting member pivoted on said pin and provided with a lug extending through said arcuate opening and engageable with opposite sides of said rectangular opening for shifting said plate member, said drive gear, and said crank means in opposite directions to selectively engage said drive gear with either said pinion gear or said internal gear to vary the speed ratio between said drive gear and said driven member; and resilient means on said plate member engageable with said frame for retaining said plate member in either position to which it is moved.

FRANK R. CHESTER.

REFERENCES CITED

The following references are of record in the file of this patent:

UNITED STATES PATENTS

| Number | Name | Date |
|---|---|---|
| 295,725 | Booth | Mar. 25, 1884 |
| 379,996 | Smith et al. | Mar. 27, 1888 |
| 601,205 | Hill | Mar. 22, 1898 |
| 971,633 | Padden | Oct. 4, 1910 |
| 1,217,832 | Saito | Feb. 27, 1917 |
| 1,663,961 | Taylor | Mar. 27, 1928 |
| 2,007,249 | Kelley | July 9, 1935 |
| 2,185,846 | Hacmac | Jan. 2, 1940 |
| 2,481,578 | Dixon | Sept. 13, 1949 |

FOREIGN PATENTS

| Number | Country | Date |
|---|---|---|
| 487,688 | Germany | Dec. 11, 1929 |